US 8,416,134 B2

(12) United States Patent
Henry et al.

(10) Patent No.: US 8,416,134 B2
(45) Date of Patent: Apr. 9, 2013

(54) SYSTEMS AND METHODS FOR PROVIDING GEOLOCATION USING WIRELESS SIGNALS

(75) Inventors: Paul Henry, Holmdel, NJ (US);
Byoung-Jo Kim, Morganville, NJ (US);
Christopher Rice, Parsippany, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 214 days.

(21) Appl. No.: 12/628,965

(22) Filed: Dec. 1, 2009

(65) Prior Publication Data
US 2011/0129022 A1    Jun. 2, 2011

(51) Int. Cl.
*G01S 5/10* (2006.01)
(52) U.S. Cl.
USPC .......................... 342/464; 342/387
(58) Field of Classification Search ................... 342/387, 342/463–464
See application file for complete search history.

(56) References Cited

U.S. PATENT DOCUMENTS

| 6,201,499 B1 * | 3/2001 | Hawkes et al. ............... 342/387 |
| 2008/0088507 A1 | 4/2008 | Smith et al. |
| 2010/0271263 A1 * | 10/2010 | Moshfeghi ................... 342/387 |

FOREIGN PATENT DOCUMENTS

| GB | 2422064 | 7/2006 |
| WO | 9939517 | 8/1999 |

OTHER PUBLICATIONS

TV Positioning (3 pages), Rosum Corporation, 2004.*
A. J. Van Dierendonck, GPS Receivers, in Global Positioning System: Theory and Applications, vol. 1, ed. B.W. Parkinson et al., p. 337-340, 1996.*

* cited by examiner

*Primary Examiner* — Jack W Keith
*Assistant Examiner* — Fred H Mull
(74) *Attorney, Agent, or Firm* — Parks IP Law LLC; Mickki D. Murray, Esq.

(57) ABSTRACT

A system for determining a location of a receiver is disclosed. The system includes at least one transmitter transmitting one or more radio signals, respectively. The system also includes a receiver comprising a clock, a memory, and a processor configured to execute computer-executable instructions stored in the memory. The instructions makes the receiver operable to receive the radio signals, capture the radio signals as one or more received signal waveform, respectively, and store the received signal waveforms in the memory. The instructions also make the receiver operable to calculate one or more virtual transmitted waveforms based upon the received signal waveforms, respectively and determine, based upon the received signal waveforms and the virtual transmitted waveforms, a position of the receiver relative to the transmitters.

20 Claims, 5 Drawing Sheets

SYSTEMS AND METHODS FOR PROVIDING GEOLOCATION USING WIRELESS SIGNALS

TECHNICAL FIELD

The present disclosure relates generally to wireless communications networks and, more particularly, to systems and methods for providing geolocation using wireless signals.

BACKGROUND

Various systems and methods exist for determining the location of a device using wireless signals. One method for determining the location of a device is multilateration. Multilateration is used in civil and military applications, for example, to locate vehicles, aircraft, and mobile or stationary receivers or emitters of radio frequency (RF) signals.

In one form of multilateration, a transmitter emits an RF signal. The position of the transmitter is determined by receiving the transmitted signal at three or more synchronized receivers located at known locations. The signal includes a time code indicating a time at which the signal was emitted. The receivers include hardware and software for computing the time difference of arrival (TDOA) of the transmitted signal at each of the receivers. The TDOA is used to determine the distance between each receiver and the transmitter. An intersection of the three distances is determined. The intersection of the three distances indicates the position of the mobile communications device at the time the received signal was transmitted, though some error typically exists from signal noise, signal interference, clock error, signal echo, and signal reception errors.

In a second form of multilateration, a receiver receives RF signals emitted by three or more transmitters. Each of the signals includes a time code indicating a time at which the signal was emitted, and travels at a known speed. In some embodiments, each signal transmitter is at a known location. Alternatively, the location of the transmitter can be encoded in the emitted signal. At any rate, the receiver includes hardware and software for computing the time difference of arrival (TDOA) of each of the received signals. The TDOA is used to determine the distance between the receiver and each of the transmitters. An intersection of the three distances is determined to indicate the location of the receiver, though subject to errors similar to those mentioned above.

This second form of multilateration, i.e., determining the TDOA of three or more signals received at a receiver, is similar to the method used by Global Positioning System (GPS) receivers. GPS receivers rely upon RF signals transmitted by a constellation of satellites with known locations. A TDOA for each received GPS signal is determined, based upon an embedded time code, a known speed of the GPS signal, and a known location of the emitting satellite. The intersection of the three or more signals is determined. This intersect indicates the location of the GPS receiver. Many GPS receivers use a signal from a fourth or additional satellite, when available, to correct error in the determined location, for example, by correcting clock error, interference, and/or for purposes of determining the altitude of the receiver.

Over the past several years, the use of mobile communications devices and networks has increased. Some modern wireless communications networks now include devices and software for providing users with location based services (LBS) such as navigation. The location of mobile communications devices may be used to provide users with services and/or features tailored to a particular location, for example, navigation, emergency services and response, location based services, and other purposes. Network operators may use location information to analyze network infrastructure, usage patterns, and the like, and/or to monitor maintenance, planning, and operational issues, if desired.

In order to provide location based services, some mobile communications devices now include GPS capabilities, and/or rely upon other systems and methods, for example, triangulation, multilateration, and/or other TDOA techniques, Assisted GPS (A-GPS), satellite links, and interfacing with short- and long-range location beacons.

With respect to TDOA techniques, mobile communications devices can receive RF signals emitted by synchronized transmitters. In general, each transmitter emits reference signals used by cellular handsets to determine position in a manner substantially similar to the methods described above. The reference signals are often emitted on a determined schedule, for example, every 10 milliseconds (ms).

Although weather conditions can have measurable effects on the reference signal speed, reference signals are usually received from relatively short range at the frequencies used for cellular communication, compared to the distances traveled by GPS signals or other long-range communications system signals. In good weather conditions and flat terrain, the maximum range of cellular signals is about 45 miles. Outside of dense urban environments, however, cellular towers are often located within 1-2 miles of each other. Even under greatly varied conditions, the short travel range of the reference signals means that the condition-based speed variations are generally negligible.

Furthermore, given the speed and short range of the cellular signals, the TDOA of the cellular signals are typically expressed as extremely small fractions of a second. As such, the 10 millisecond pause between signal transmissions is generally adequate to prevent the handset from mistakenly relying upon more than one synchronized reference signal emission for any particular location determination operation.

SUMMARY

An exemplary embodiment of the present disclosure is directed to a system for determining a geolocation of a receiver. The system includes a transmitter configured to transmit a radio signal, a receiver communicatively linked to the transmitter. The receiver includes a clock, a memory, and a processor. The processor is configured to execute computer-executable instructions stored in the memory. Execution of the computer-executable instructions makes the receiver operable to receive the radio signal and capture signal data, the signal data comprising information corresponding to the radio signal. In some embodiments, the instructions make the receiver further operable to obtain time data, the time data being generated by the clock, and to store the signal data and the time data in the memory. The receiver calculates, based upon the signal data, a virtual transmitted signal and determines, based upon the signal data, the time data, and the virtual transmitted signal, a time difference. The time difference comprises the time between a transmission of the radio signal at the transmitter and the reception of the radio signal at the receiver.

In some embodiments, the system further includes a second transmitter configured to transmit a second radio signal and a third transmitter configured to transmit a third signal. The receiver is further operable to receive the second radio signal and the third radio signal.

In some embodiments, the transmitter includes a base station operating on a cellular communications network, and the receiver includes a mobile communications device in communication with the cellular communications network. In some embodiments, the receiver further includes a virtual transmitter module configured to generate a data stream. The data stream is substantially identical to a transmitted data stream transmitted by the transmitter. In some embodiments, the virtual transmitter module is further configured to virtually transmit the data stream to obtain a virtual transmitted signal waveform.

In some embodiments, the receiver further includes a time shift determiner configured to compare the virtual transmitted signal waveform to the received signal waveform to determine a time shift. The time shift relates to the time of arrival of the corresponding radio signal, and time shifts regarding signals from various transmitters (e.g., a first, second, and third transmitter) can be compared to determine a position of the receiver relative to the transmitters.

In some embodiments, the receiver of the system is further configured to obtain transmitter location data for the transmitter, and determine the location of the receiver based at least in part upon the transmitter location data and the determined position of the receiver relative to the transmitter.

In some embodiments, the virtual transmitter module includes a data stream determination application. The data stream determination application applies a fast Fourier transform (FFT) algorithm to the received signal waveform to create a data output and transmits the data output to an orthogonal frequency-division multiplexing (OFDM) demodulator to generate a virtual transmitted data stream.

In some embodiments, the virtual transmitter module includes a virtual transmitter application. The virtual transmitter application receives the virtual transmitted data stream, transmits the virtual transmitted data stream to an OFDM modulator to generate a modulated data stream, and applies an inverse fast Fourier transform (IFFT) algorithm to the modulated data stream to generate a virtual transmitted signal waveform. In some embodiments, the receiver of the system is operable to store the virtual transmitted signal waveform in the memory.

Another exemplary embodiment of the present disclosure is directed to a method for determining a geolocation of a receiver. The method includes transmitting from a transmitter, the radio signal, receiving the radio signal at a receiver in communication with the transmitter, and capturing signal data at the receiver, the signal data including information corresponding to the radio signal. The method further includes obtaining time data at the receiver, the time data being generated by a clock in communication with the receiver, storing, at a memory device associated with the receiver, the signal data and the time data, and calculating, at the receiver, a virtual transmitted signal, wherein the virtual transmitted signal is calculated based, at least partially, upon the signal data. The method further includes determining, at the receiver, a time difference, the determining being based, at least partially, upon the signal data, the time data, and the virtual transmitted signal. The time difference includes the time between a transmission of the radio signal at the transmitter and a reception of the radio signal at the receiver.

In some embodiments, the method further includes generating a data stream at a virtual transmitter module, the data stream being substantially identical to a transmitted data stream transmitted by the transmitter, and virtually transmitting the data stream to obtain a virtual transmitted signal waveform. In some embodiments, the method further includes comparing, at a time shift determiner associated with the receiver, the virtual transmitted signal waveform to the received signal waveform, and determining, at the time shift determiner, a time shift including a time between a transmission of the radio signal at the transmitter and a reception of the radio signal at the receiver.

In some embodiments, the method further includes determining a position of the receiver relative to the transmitter (such as relative to two, three, or more transmitters) based on the determined time shift (or two, three, or more respective determined time shifts). In some embodiments, the method includes obtaining, at the receiver, transmitter location data for the transmitter, and determining the location of the receiver based at least in part upon the transmitter location data and the determined position of the receiver relative to the transmitter.

In some embodiments, the method further includes applying a fast Fourier transform (FFT) algorithm to the received signal waveform to create a data output, transmitting the data output to an orthogonal frequency-division multiplexing (OFDM) demodulator to generate a virtual transmitted data stream, transmitting the virtual transmitted data stream to an OFDM modulator to generate a modulated data stream, applying an inverse fast Fourier transform (IFFT) algorithm to the modulated data stream to generate a virtual transmitted signal waveform, and storing the virtual transmitted signal waveform at the memory.

Another exemplary embodiment of the present disclosure is directed to a computer readable medium. The computer readable medium includes computer readable instructions that, when executed, cause a receiver to perform the steps including receiving a radio signal, the radio signal being transmitted by a transmitter in communication with the receiver, capturing signal data, the signal data including information corresponding to the radio signal, and obtaining time data, the time data being generated by a clock in communication with the receiver. The steps further include storing, at a memory device associated with the receiver, the signal data and the time data, calculating, a virtual transmitted signal, wherein the virtual transmitted signal is calculated based, at least partially, upon the signal data, and determining a time difference, the determining being based, at least partially, upon the signal data, the time data, and the virtual transmitted signal. The time difference includes the time between a transmission of the radio signal at the transmitter and the reception of the radio signal at the receiver.

In some embodiments, the computer readable medium further includes instructions that, when executed, cause a receiver to perform the additional steps of generating a data stream at a virtual transmitter module associated with the receiver, the data stream being substantially identical to a transmitted data stream transmitted by the transmitter, virtually transmitting the data stream at a virtual transmitter associated with the receiver to obtain a virtual transmitted signal waveform. The instructions enable the processor to determine time shifts with respect to signals received from various transmitters, and determine a position of the receiver relative to three or more transmitters based on the corresponding time shifts. In some embodiments, the instructions cause the receiver to obtain transmitter location data for the transmitters, and determine the location of the receiver based upon the transmitter location data and the determined position of the receiver relative to the transmitters.

In some embodiments, the computer readable medium further includes instructions that, when executed, cause a receiver to perform the additional steps of applying, at a virtual transmitter module, a fast Fourier transform (FFT) algorithm to the received signal waveform to create a data output, transmitting the data output to an orthogonal frequency-division multiplexing (OFDM) demodulator to generate a virtual transmitted data stream, transmitting the virtual transmitted data stream to an OFDM modulator to generate a modulated data stream, and applying an inverse fast Fourier transform (IFFT) algorithm to the modulated data stream to generate a virtual transmitted signal waveform.

The computer readable medium further includes instructions that, when executed cause the receiver to perform the additional steps of storing the virtual transmitted signal waveform at the memory, retrieving, at a time shift determiner associated with the receiver, the transmitted signal waveform, comparing, at the time shift determiner, the virtual transmitted signal waveform to the received signal waveform, and determining, at the time shift determiner, the time shift being the time required to match the virtual transmitted signal waveform to the received signal waveform by cross-correlation.

DETAILED DESCRIPTION

As required, detailed embodiments of the present disclosure are disclosed herein. It must be understood that the disclosed embodiments are merely examples of the disclosure that may be embodied in various and alternative forms, and combinations thereof. As used herein, "exemplary" and like terms are used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
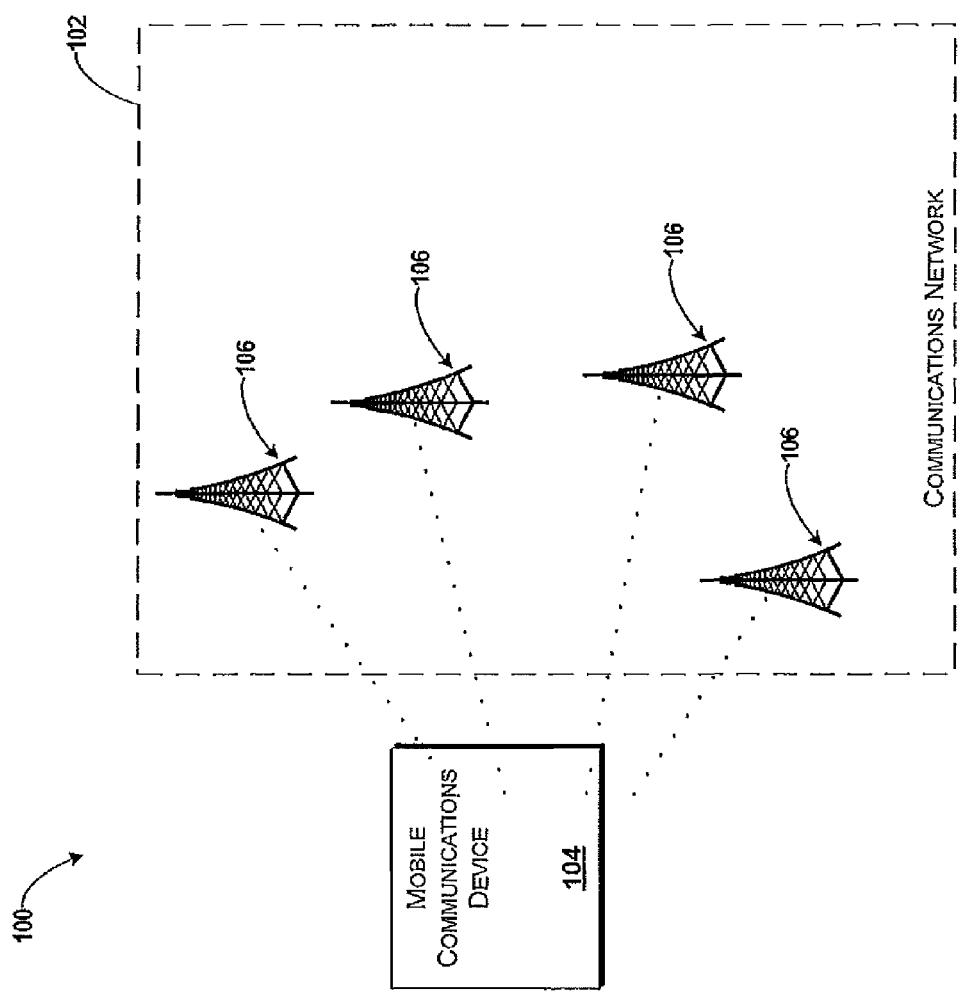
FIG. 1 schematically illustrates a system for determining geolocation using wireless signals, according to an exemplary embodiment of the present disclosure.

Referring now to the drawings in which like numerals represent like elements throughout the several views, FIG. 1 schematically illustrates a system 100 for providing geolocation using wireless signals, according to an exemplary embodiment of the present disclosure. The system 100 includes a wireless communications network 102. In some embodiments, the wireless communications network 102 includes a cellular network, and is in communication with a packet data network, for example, the Internet, a circuit switched network, for example, a publicly-switched telephone network (PSTN), other networks, combinations thereof, and the like. A wireless communications device 104 ("device") is illustrated in communication with the wireless communications network 102. In some embodiments, the device 104 is a smart phone, a mobile telephone, a laptop with wireless communications capability, a handset, a tether, a combination thereof, and/or the like. In some embodiments, the device 104 is configured for communication with additional and/or alternative networks via the wireless communications network 102 or via network connections to other networks.

In some embodiments, the wireless communications network 102 includes various components such as, but not limited to, base transceiver stations (BTS's) or Node-B's 106 ("base stations"), base station controllers (BSC's), radio network controllers (RNC's), mobile switching centers (MSC's), short message service centers (SMSC's), multimedia messaging service centers (MMSC's), home location registers (HLR's), visitor location registers (VLR's), charging platforms, billing platforms, voicemail platforms, GPRS core network components, location service nodes, Internet protocol multimedia subsystem (IMS) components, and the like. In FIG. 1, four base stations 106 are illustrated in communication with the device 104. In some embodiments, the wireless communications network 102 includes radios and nodes for receiving and transmitting voice, data, and combinations thereof to and from radio transceivers, networks, and the Internet.

In some embodiments, the wireless communications network 102 is configured as a 2G GSM (Global System for Mobile communications) network, and is able to provide data communications via GPRS (General Packet Radio Service) and EDGE (Enhanced Data rates for GSM Evolution). In some embodiments, the wireless communications network 102 is configured as a 3G UMTS (Universal Mobile Telecommunications System) network and is able to provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). In some embodiments, the wireless communications network 102 is compatible with future and emerging mobile communications standards including, but not limited to, pre-4G and 4G standards including the 3GPP long term evolution standard (LTE) and LTE Advanced. The wireless communication network 102 will be described as a UMTS network operating In accordance with the LTE standard.

Figure 2:
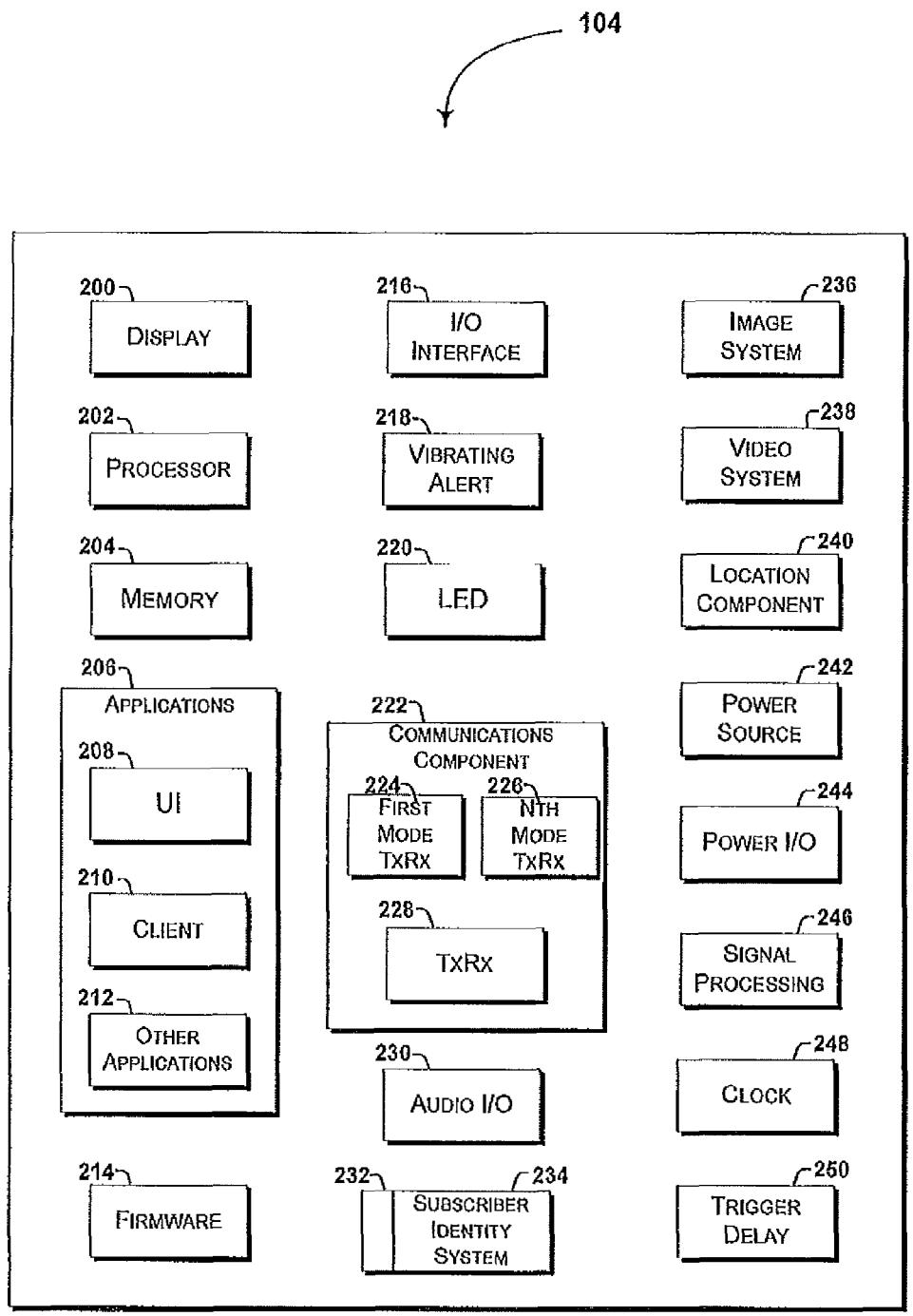
FIG. 2 schematically illustrates a device for determining geolocation using wireless signals, according to an exemplary embodiment of the present disclosure.

FIG. 2 illustrates a schematic block diagram of an exemplary device 104 for use in accordance with exemplary embodiments of the present disclosure. Although no connections are shown between the components illustrated in FIG. 2, the components interact with each other to carry out functions of the device 104.

Further, although some components are shown or described separately or described as having separate functions, components or functions shown or described as such are in some embodiments combined and/or performed together. And some components or functions shown or described together are in some embodiments performed by separate components and/or performed separately.

It should be understood that FIG. 2 and the following description are intended to provide a brief, general description of a suitable environment for implementing various aspects of some embodiments of the present disclosure. While the description includes a general context of computer-readable instructions, other program modules and/or as a combination of hardware and software are contemplated. The term "application," or variants thereof, is used expansively herein to include routines, program modules, programs, components, data structures, algorithms, and the like. Applications are executable on various system configurations, including single-processor or multiprocessor systems, minicomputers, mainframe computers, personal computers, hand-held computing devices, microprocessor-based, programmable consumer electronics, combinations thereof, and the like.

The illustrated device 104 is a multimode headset, though single- and dual-mode headsets or other devices are contemplated. The device 104 includes a variety of computer-readable media, including volatile media, non-volatile media, removable media, and non-removable media. The term "computer-readable media" and variants thereof, as used in the description and claims, includes volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium for storing the desired information, and that is accessible and/or executable by the device 104.

The device 104 includes a display 200 for displaying multimedia such as, for example, text, images, video, telephony functions such as Caller ID data, setup functions, menus, music, metadata, messages, wallpaper, graphics, Internet content, device status, preferences settings, map data, navigation data, location data, and the like. The device 104 includes a processor 202 for controlling, executing, and/or processing data. A memory 204 interfaces with the processor 202 and stores data. The data stored by the memory 204 includes programs, routines, subroutines, algorithms, software, tools, and the like ("instructions") executable by the processor 202. The instructions include, for example, applications 206.

In some embodiments, the applications 206 include, for example, location applications, navigation applications, web browsing software, feedback applications, text input software, mapping software, audio player software, video playback software, voicemail software, audio playback software, music player software, email software, messaging software, combinations thereof, and the like.

In some embodiments, the applications 206 also include a user interface (UI) application 208. The UI application 208 interfaces with a client 210 (e.g., an operating system) to facilitate user interaction with device functionality and data, for example, browsing the Internet, controlling device-based and/or web-based applications, answering/initiating calls, accepting/outputting navigation data, entering/deleting data, configuring settings, address book manipulation, multimode interaction, and the like.

In some embodiments, the applications 206 also include other applications 212 such as, for example, firmware, location determination applications, data stream determination applications, virtual transmitter applications, navigation applications, location sharing applications, visual voicemail applications, add-ons, waveform analysis applications, virtual transmitter applications, applications for facilitating analog/digital (A/D) and/or digital/analog (DAC) conversions, signal modulation applications, signal demodulation applications, signal processing applications, e.g., applications for applying fast Fourier transform (FFT) and inverse FFT (IFFT) algorithms, plug-ins, voice processing applications, voice recording applications, messaging applications, e-mail processing applications, video processing applications, image processing applications, data archival applications, music playback applications, combinations thereof, and the like. The other applications 212 control and/or interact with systems, subsystems, and/or components of the device 104, other networks, other systems, and/or other network devices.

The applications 206 are stored in the memory 204 and/or in a firmware 214 as executable instructions, and are executed by the processor 202. The firmware 214 also stores code for execution during initialization of the device 104.

An input/output (I/O) interface 216 is provided for input/output of data and/or signals. In some embodiments, the I/O interface 216 includes a hardwire connection, such as, for example, a USB port, a mini-USB port, an audio jack, a PS2 port, an IEEE 1394 port, a serial port, a parallel port, an Ethernet (RJ48) port, a telephone (RJ11) port, and the like, and accepts other I/O devices such as, for example, keyboards, keypads, mice, interface tethers, stylus pens, printers, thumb drives, touch screens, multi-touch screens, touch pads, trackballs, joy sticks, microphones, remote control devices, voice control interfaces, monitors, displays, liquid crystal displays (LCD's), combinations thereof, and the like. It should be appreciated that the device 104 can communicate with a network and/or local devices via the I/O interface 216.

The device 104 includes a vibrating alert 218 for providing a vibration alert function for the device 104. The device 104 also includes one or more light emitting diodes 220 (LED's) for providing device status information, visual alerts, warnings, and the like.

A communications component 222 interfaces with the processor 202 to facilitate wired/wireless communications with external systems including, for example, a wireless communications network 102, VoIP networks, local area networks (LAN's), wide area networks (WAN's), metropolitan area networks (MAN's), personal area networks (PAN's), and other devices and networks 112, which are implemented using WI-FI®, WIMAX®, BLUETOOTH®, near-field communications (NFC), infrared, infrared data association (IrDA), other radio frequency (RF) applications, combinations and/or improvements thereof, and the like (WI-FI is a registered trademark of the Wi-Fi Alliance, of Austin, Tex.; WIMAX is a registered trademark of the WiMAX Forum, of Mountain View, Calif.; and BLUETOOTH is a registered trademark of BLUETOOTH SIG, INC., of Bellevue Wash.). In some embodiments, the communications component 222 is used instead of, or in addition to, the I/O interface 216.

In some embodiments, the communications component 222 also includes a multimode communications subsystem for providing cellular communications via different cellular technologies. In some embodiments, for example, a first cellular transceiver 224 operates in a first mode, for example, GSM, and an Nth transceiver 226 operates in a different mode, for example UMTS. Although only two transceivers 224, 226 are illustrated, it should be appreciated that some embodiments of the device 104 include more than two transceivers.

In some embodiments, the communications component 222 includes a transceiver 228 for unlicensed communications. The transceiver 228 is configured to communicate using radio signals. In some embodiments, the transceiver 228 communicates via signals transmitted according to the IEEE 802.11a, b, g, and/or n standards, i.e., WI-FI® signals, signals transmitted according to the IEEE 802.16 standard, i.e., WIMAX®, signals transmitted according to the IEEE 802.20 standard, i.e., Mobile Broadband Wireless Access (MBWA), signals transmitted according to the IEEE 802.16e standard, i.e., Mobile WIMAX®, additional or alternative wireless communications network 102 signals, signals transmitted according to any of the IEEE 802.15.x standards, i.e., BLUETOOTH®, infrared signals, IrDA, signals transmitted according to the ECMA-342 and ECMS 352 standards, i.e., NFC, other RF signals, combinations thereof, and the like. The communications component 222 also facilitates communications reception from terrestrial radio networks, digital satellite radio networks, Internet-based radio services networks, combinations thereof, and the like.

The communications component 222 passes and/or processes data from one or more networks including, for example, the Internet, a corporate intranet, GPS networks, a home broadband network, and the like, via an Internet service provider (ISP), a digital subscriber line (DSL) provider, a cable provider, and/or a broadband provider. Although not illustrated, the communications component 222 includes, or is connected to, one or more antennae through which data is transmitted and/or received.

The device 104 includes an audio I/O component 230 for providing the device 104 with audio capabilities. The audio I/O component 230 includes, but is not limited to, speakers to output audio signals, microphones to collect audio signals, and I/O ports for input and output of audio signals. The I/O ports include, for example, headphone, speaker, and/or microphone jacks, though other interfaces are contemplated. The audio I/O component 230 also includes speakers, for example, an earpiece speaker, a loudspeaker, a ringer, and the like.

The device 104 includes a slot interface 232 for accommodating a subscriber identity system 234 such as, for example, a SIM or universal SIM (USIM). In some embodiments, the subscriber identity system 234 instead is manufactured into the device 104, thereby obviating the need for a slot interface 232. In some embodiments, the subscriber identity system 234 stores certain features, account information, user information, rules, policies, models, and the like. The subscriber identity system 234 is programmed by a manufacturer, a retailer, a customer, a network operator, and/or another authorized entity.

The device 104 includes an image capture and processing system 236 (image system). Photos and/or videos are obtained via an associated image capture subsystem of the image system 236, for example, a camera. The device 104 also includes a video system 238 for capturing and recording video content. In some embodiments, the video system 238 provides video data to various applications 206, for example, video teleconferencing applications, video compression applications, video messaging applications, video sharing applications, and the like.

The device 104 includes a location component 240 to send and/or receive signals used for determining location of the device 104. In some embodiments, the location component 240 includes a GPS receiver for receiving GPS signals. In some embodiments, the location component 240 receives A-GPS data, signals transmitted according to the IEEE 802.11a, b, g, and/or n standards, i.e., WI-FI® signals, signals transmitted according to the IEEE 802.16 standard, i.e., WIMAX®, signals transmitted according to the IEEE 802.20 standard, i.e., Mobile Broadband Wireless Access (MBWA), signals transmitted according to the IEEE 802.16e standard, i.e., Mobile WIMAX®, additional or alternative wireless communications network 102 signals, combinations thereof, and the like. The location component 240 receives and/or transmits signals via one or more antennae (not illustrated). The location component 240 interfaces with wireless communications network 102 nodes, satellites, location transmitters and/or beacons, wireless network transmitters and receivers, base stations 106, wireless networking hotspots, short- and long-range radio transmitters, wired resources such as telephone lines, combinations thereof, and the like.

The device 104 obtains, generates, and/or receives data to identify its location, or transmits data used by other devices to determine the device 104 location. The location component 240, and methods for determining location, will be described in additional detail below with reference to FIGS. 3-5.

The device 104 includes a power source 242 such as batteries and/or other power subsystems (AC or DC). In some embodiments, the power source 242 interfaces with an external power system or charging equipment via a power I/O component 244.

The device 104 includes a signal processing module (SPM) 246. The SPM 246 includes hardware and/or software for digital and/or analog signal processing, recording, analyzing, and/or comparing. The SPM 246 can interact with the communications component 222 for signal reception, transmission, and/or processing. As such, in some embodiments, the SPM 246 and/or the communications component 222 includes, or is in communication with, signal processing hardware and/or software.

In some embodiments, the SPM 246 includes RF Amplifiers, RF filters, analog-to-digital converters (A/D's), digital-to-analog converters (DAC's), and/or other signal and data processing hardware and/or software. In some embodiments the SPM 246 includes a virtual transmitter module (VTM) (not illustrated in FIG. 2).

The SPM 246 in various embodiments includes hardware and/or software for applying FFT algorithms, IFFT algorithms, OFDM modulation, OFDM demodulation, and DAC's and A/D's. The SPM 246 can be controlled by or can interact with the applications 206. The SPM 246, and particular components thereof, is described below with reference to FIGS. 3-5.

As also shown in FIG. 2, the device 104 further includes a clock 248. In some embodiments, the clock 248 does not have to be an exceptionally accurate timing device, as opposed to clocks generally required for GPS devices. Rather, the clock 248 is a free-running clock that provides a periodic time tick. In some embodiments, the device 104 uses output of the clock 248, such as a periodic time tick, as a time reference mark for a trigger delay box 250 (also known as a time shifter).

The trigger delay box 250 controls the timing of the output of a signal data capture device, such as a waveform capture device (not illustrated). Though capturing the received signal as a waveform is primarily disclosed herein, it is contemplated that the received signal may in some embodiments be captured, and analyzed, in other forms.

In some embodiments, the functions of the trigger delay box 250 and/or the signal data capture device, such as the waveform capture device are implemented as software or a combination of hardware and software, such as the VTM (not shown in FIG. 2). The functions of the trigger delay box 250 are in some embodiments implemented by an application running at the device 104 or by an application associated with the device 104. It should be understood that the functions of the clock 248 and the trigger delay box 250 may be provided by one or more modules of the SPM 246.

In some embodiments, the delay trigger box 250 has an adjustable delay/advance relative to the clock 248. In operation, the delay trigger box 250 shifts an approximated waveform in time to find a match with a received waveform, and a time shift giving the closest match is noted. These functions will be described in more detail below.

Figure 3:
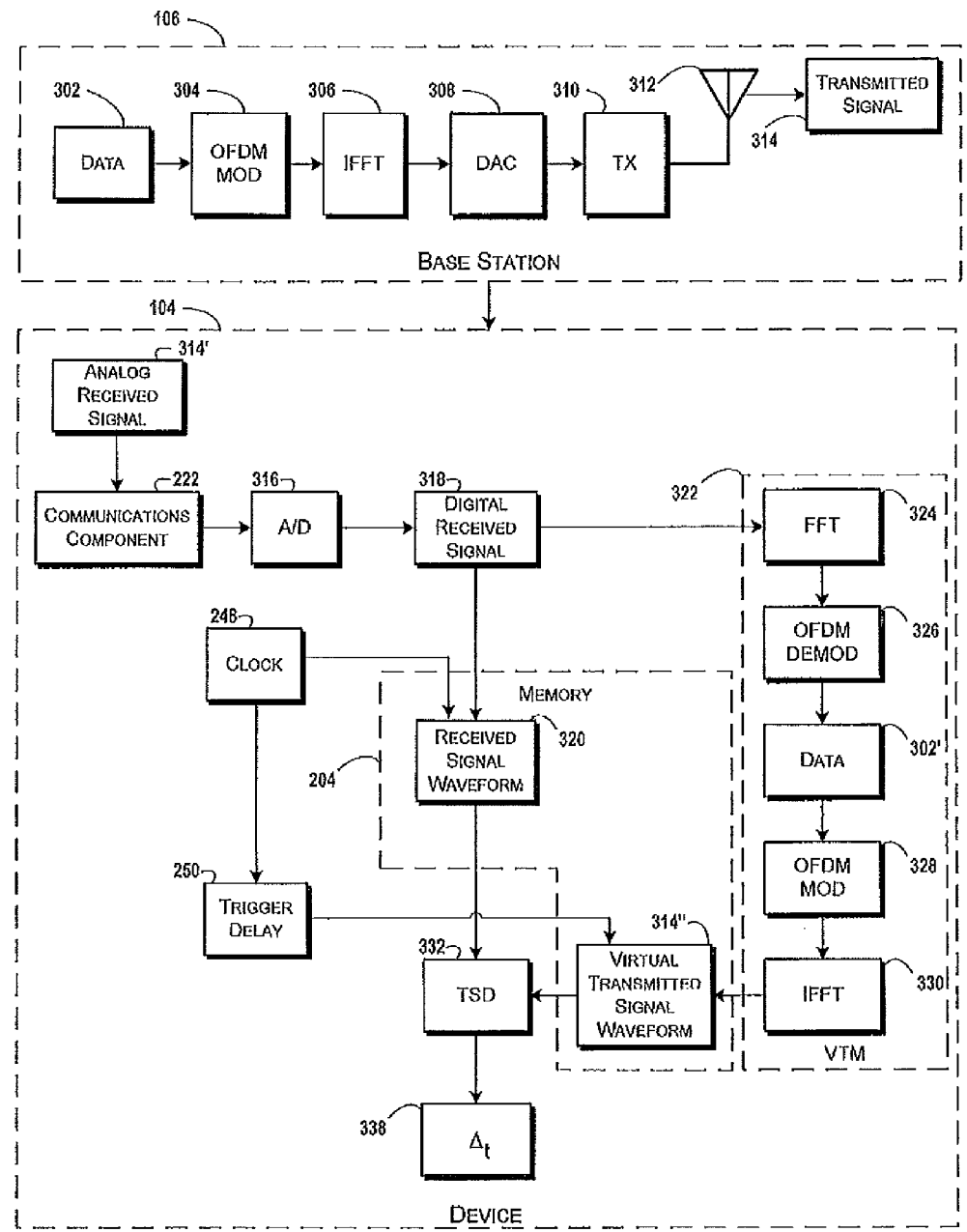
FIG. 3 illustrates a flow diagram of determining geolocation using wireless signals, according to an exemplary embodiment of the present disclosure.

FIG. 3 illustrates a flow diagram of determining geolocation using wireless signals, according to an exemplary embodiment of the present disclosure. As discussed above, the wireless communications network 102 includes base stations 106. A data stream 302 ("data") is received at hardware associated with the base station 106, for example, a BTS, a Node-B, and/or a hardware component of the BTS or Node-B. The data 302 is processed for transmission via an air interface to the device 104. Processing the data 302 for transmission includes, in some embodiments, using software and hardware to modulate the data 302 according to a modulation scheme.

In some embodiments, the signal modulation scheme includes orthogonal frequency-division multiplexing (OFDM). OFDM is implemented, in some embodiments, by an OFDM modulator 304 (OFDM MOD) and an IFFT algorithm 306 (IFFT), which are provided by hardware and/or software associated with the base station 106.

The modulated data stream is passed to the DAC 308, which converts the digital data to an analog signal. The analog signal is transmitted by a transmitter 310, such as one or more antennae 312 that are part of or in communication with the base station 106. The transmitted signal 314 is received by a communications component 222 of the device 104 as the received signal 314'.

The transmitted signal 314 and the received signal 314' may be identical, substantially identical, substantially different, or different, depending upon various conditions. For example, the received signal 314' may include noise, interference, echo, and/or the like that was not present when the received signal 314' was transmitted as the transmitted signal 314. Additionally, or alternatively, weather conditions such as varied pressure and/or temperature may alter the received signal 314' if received in conditions not intended by the receiver manufacturer.

In some embodiments, as explained above with reference to FIG. 2, the received signal 314' is processed by passing through signal reception hardware, software, and/or circuitry including, for example, RF amplifiers and/or RF filters, illustrated in FIG. 3 as the communications component 222. The communications component 222 passes the analog received signal (e.g., analog radio-frequency (RF) signal) to an analog-to-digital converter (A/D) 316, which converts the analog received signal to a digital received signal 318. The analog-to-digital converter (A/D) is in various embodiments a hardware element (not shown in detail in FIG. 2) of the mobile device 104.

As illustrated in FIG. 3, the received signal 318 is captured as received signal data. In some embodiments, the received signal data is a received signal waveform 320, and the received signal waveform 320, or a copy thereof, is stored in a temporary or permanent storage device.

It should be understood that the received signal 318 and the received signal waveform 320 may be identical. The received signal waveform 320 is stored in any suitable storage device, for example, the memory 204, a buffer (not illustrated), a cache (not illustrated), or another storage location accessible by the device 104. Similarly, in some embodiments the time reference mark and/or a data association between the time reference mark and the received signal waveform 320 are stored in any suitable storage device, for example, the memory 204, a buffer (not illustrated), a cache (not illustrated), or another storage location accessible by the device 104.

In some embodiments, timing of capturing the received signal 318 as the received signal waveform 320 is based upon a trigger event. In some embodiments, the clock 248 periodically outputs a time reference mark. The clock 248 is communicatively coupled to the delay trigger box 250. In some embodiments, a waveform capture device or application is controlled by the delay trigger box 250, which triggers waveform output based upon the output time reference mark received from the clock 248. The delay trigger box 250, in some embodiments controls capture of the received waveform 320, though shown in FIG. 3 controlling capture of the virtual transmitted waveform 314". It is contemplated that in various embodiments, one or more delay trigger boxes 250 are used to control capture of received waveforms 320 and virtual transmitted waveforms 314".

In some embodiments, the device 104 stores the output time reference mark from the clock 248 with the received signal waveform 320. In some embodiments, the device 104 stores the output time reference and creates a data association between the time reference mark and the received signal waveform 320. Regardless of the process used, the received signal waveform 320 and the time at which the received signal waveform 320 is captured are determined and are, therefore, known. The time reference mark will be discussed in more detail below.

In some embodiments, the received signal 318, or a copy thereof, also is passed to a virtual transmitter module (VTM) 322. The VTM 322, or an application associated therewith, processes the received signal data, e.g., received signal waveform 320, or the received signal 318, to approximate the transmitted signal 314. In some embodiments, the VTM 322, a virtual transmitter application, and/or a data stream determination application applies a fast Fourier transform (FFT) algorithm 324 to the received signal waveform 320 or the received signal 318 and the output is demodulated using an OFDM demodulator 326 (OFDM DEMOD) to obtain a data stream 302' (data). The data stream 302' approximates the data 302 originally transmitted by the base station 106. As such, it should be understood that the data 302' is theoretically identical to the data 302.

The data 302' is processed for virtual transmission by the VTM 322 and/or the virtual transmitter application. As illustrated, the data 302' is modulated according to a modulation scheme. The signal modulation scheme includes OFDM and is implemented at the VTM 322 by passing the data 302' to an OFDM modulator 328 (OFDM MOD), and applying an inverse FFT algorithm 330 (IFFT) to obtain a virtual transmitted signal, or virtual IFFT signal 314" (also referred to as a replica signal). The virtual transmitted waveform 314" is captured and associated with a time reference mark and/or a data association between the time reference mark and the virtual transmitted waveform 314", and the captured waveform 314" and the time reference mark and/or data association are stored in a suitable storage device accessible by the device 104. In some embodiments, the time reference mark refers to a time and/or time range, based for example on the local clock 248, at which the virtual transmitted waveform 314" was captured.

It should be understood that the functions of the OFDM Modulator 328 and the IFFT algorithm 330 are in some embodiments performed by the virtual transmitter application. It is contemplated that the virtual transmitted signal waveform 314" is theoretically identical to the output from the IFFT 306.

In some embodiments, the virtual transmitted signal waveform 314" is stored at the memory 204 or another storage location, is transmitted to a remote signal analysis platform (not illustrated) in communication with the device 104, or is passed to a time shift determiner (TSD) 332 for use in determining a relative time shift between the received waveform 320 and the virtual transmitted waveform 314", as described further below. It should be understood that the remote signal analysis platform is configured to determine the time shift using similar hardware and methodologies as described herein in connection with the TSD 332. The use of the remote signal analysis platform allows the device 104 to offload intensive calculations, if desired. The TSD 332 may also be referred to as a cross-correlator for its correlating functions described in more detail below.

As illustrated, the received signal waveform 320 and the virtual transmitted signal waveform 314" are passed to the TSD 332 for analysis. The TSD 332 determines a time shift Δt of the received signal waveform 320 with respect to the virtual transmitted signal waveform 314", as will be described in more detail with reference to FIG. 4. The TSD 332 outputs the determined time shift Δt 338. The time shift Δt is output to an application, transmitted to a network device, and/or stored at a memory 204 or other data storage device associated with or in communication with the device 104.

Figure 4:
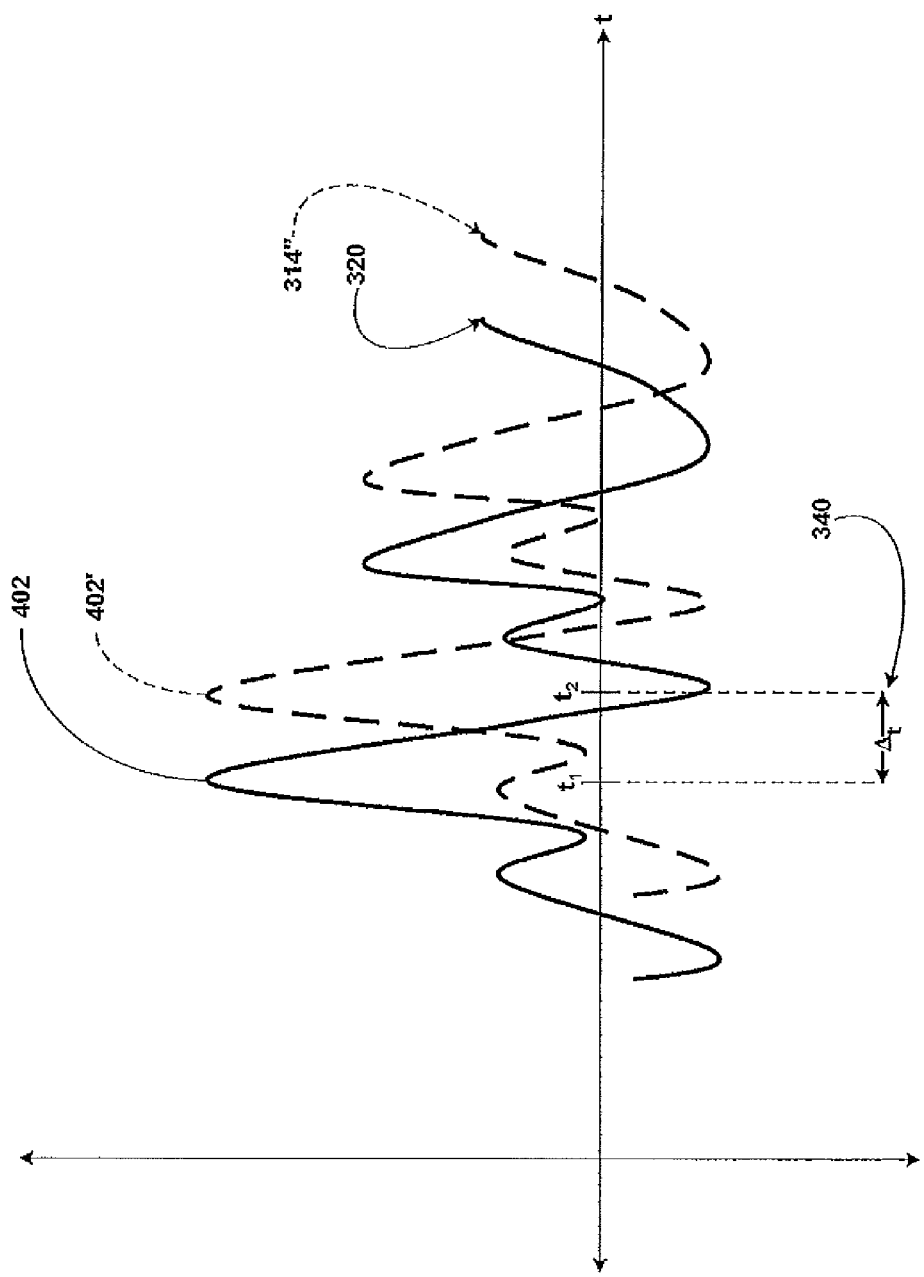
FIG. 4 schematically illustrates a time shift between a virtual transmitted wireless signal and a received wireless signal, according to an exemplary embodiment of the present disclosure.

FIG. 4 schematically illustrates a virtual transmitted wireless signal waveform 314" compared to a received signal waveform 320 for calculating a time shift Δt between them according to an exemplary embodiment of the present disclosure. The received signal waveform 320 and the virtual transmitted signal waveform 314" are illustrated. It should be understood that the illustrated waveforms 314", 320 are merely exemplary waveforms and are provided solely for illustration and description of concepts of the present disclosure. Furthermore, it should be understood that the concepts of the present disclosure may be implemented without graphically representing the waveforms 314", 320.

In FIG. 4, the waveforms 314", 320 are graphically represented by their amplitudes over time. The TSD 332 identifies one or more characteristic or values of the received signal waveform 320. In FIG. 4, the TSD 332 identifies at least one characteristic 402, and in embodiments, the entire waveform of the received signal waveform 320. The TSD 332 then identifies a waveform matching the received waveform and determines the amount of time shift needed to cross-correlate the two waveforms. The TSD 332 identifies at least one characteristic 402', such as, in some embodiments, the entire waveform, of the virtual transmitted waveform 314" matching the at least one characteristic 402, for example the entire waveform, of the received signal waveform 320.

Generally, the TSD 332 compares the received waveform 320 with the replica or virtual transmitted signal 314", including their respective time stamps, from the local clock 248, for example, to determine the time shift needed to match them. It is contemplated that the local clock 248 is, in some embodiments, synchronized to an external time, such as a GPS time.

As referred to above, the receiver 104 creates the virtual transmitted, or replica waveform 314" based on the digital received signal 318, which in turn is based on the analog received signal 314'. Conceptually, the virtual transmitted waveform 314" matches the output of the IFFT algorithm 306. The device 104 then determines the time, according to the local clock 248, at which a waveform (e.g., of received signal 314') looking like the virtual transmitted signal 314" was received.

The receiver 104 determines the local time at which a waveform looking like the virtual transmitted, or replica signal 314" was received by the TSD 332 by comparing the received waveform 320 with the virtual transmitted waveform 314", and time-shifting the waveforms relative to one another to determine a best match, being the highest cross-correlation of waveform characteristics. The amount of time shift required to correlate the virtual transmitted waveform 320 to the received waveform 314" corresponds to the local time of arrival of the analog received signal 314'.

The TSD 332 seeks and identifies a waveform looking like the virtual transmitted signal 314" by identifying one or more characteristics, and in embodiments, entire waveforms, of the virtual transmitted signal 314" and seeking the same characteristics in received waveforms. Once the identified characteristic of the virtual transmitted signal 314" are found, the TSD 332 determines the amount of time shift needed to match the two; i.e., determines the difference in local time between the virtual transmitted signal 314" and the matching received waveform.

For simplicity of explanation, FIG. 4 illustrates how the TSD 332 finds and matches (i.e., cross-correlates) a virtual transmitted waveform 314" to a received waveform with reference to only a single waveform characteristic. In some embodiments, the TSD 332 compares, or cross-correlates, multiple characteristics or characteristics, and in some entire waveforms 314" and 320.

The TSD 332 in some embodiments cross-correlates waveforms for a range of time to determine the particular time shift resulting in the best match, or largest cross-correlation. Generally, though cross-correlation is shown in FIG. 4 with reference to a single characteristic, it will be appreciated that accuracy of cross correlation of the TSD 332 increases as more characteristics of the waveforms 314"/320, up to the entirety of the waveforms 314"/320, are considered in the cross-correlation.

In FIG. 4, the time $t_1$ corresponds to the time at which the characteristic 402 in the captured received signal waveform 320 was actually observed at the device 104. The time $t_2$ corresponds to the time at which an identified matching characteristic 402' occurs in the virtual transmitted signal 314". Particularly, for example, the time $t_1$ is in some embodiments calculated based upon the time reference mark associated with the received signal waveform 320, as described above. The TSD 332 receives or retrieves the time reference mark for the time shift analysis. It is noted that the TSD 332 need not actually identify a time (e.g., $t_1$ or $t_2$), but rather be able to compare the matching waveforms and their respective time marks to determine a time shift, or time delay Δt between them.

The device 104 (e.g., the location component 240) performs the process with respect to a second transmitter (e.g., base station 106) to determine a time delay Δt for a signal received from the second transmitter. The location component 240 is configured to compare the time delay Δt corresponding to the first base station 106 to the time delay Δt corresponding to the second base station 106, and a time difference between transmission of the first signal from the first transmitter and transmission of the second signal from the second transmitter, to determine where the device 104 is positioned with respect to the base stations 106.

The device 104, and particularly, for example, the location component 240 of the device 104, is configured to determine a position of the device 104 relative to the base stations 106 based on the relative values of the time delays Δt and a difference, if any, between the timing of transmissions from the base stations 106, according to well-known positioning techniques. For example, if the time delay Δt for the signal from the first base station 106 is the same as the time delay Δt for the signal from the second base station 106, and the signal from the first base station was sent at the same time as the signal from the second base station, then the location component 240 can determine that the device 104 is equidistant from the two stations 106, positioned somewhere on a straight line bisecting the two stations 106.

If, on the other hand, the device 104 determines that the time delay Δt corresponding to the first base station 106 is less than the time delay Δt corresponding to the second base station 106, and again with the signals being transmitted from the base stations 106 simultaneously, then the location component 240 determines that the device 104 is positioned closer to the first base station 106 than the second base stations 106 by an amount corresponding to the difference between the time delays Δt.

Regarding cases of non-equal time delays Δt for two base stations 106, and/or time differences between transmissions from the base stations, the location component 240 could determine that the device is positioned relative to the two base stations 106 along a curve (e.g., a hyperbola) matching the proportion of the first time delay Δt to the second time delay Δt.

The location component 240 is further configured to compare the time delay Δt for a third signal, from a third base station 106 to the signals from the first two base stations 106 to identify the particular location of the device 104. The location component 240 may compare three or more time delays, as such, in any order or generally simultaneously to determine the relative position of the device 104 with respect to the three or more stations 106. The location component 240 is able to determine a geolocation of the device 104 based on the determined relative position of the device 104 with respect to the three or more base stations 106 and the known geolocation of the base stations 106.

Locations of the base stations 106, as well as transmission timing information (e.g., timing of transmission for each station or relative transmission timing data regarding multiple base stations, and the like), for the base stations 106, are known by or accessible by the device 104. In some embodiments, the device 104 stores cell ID information, corresponding location information, and/or transmission timing information for base stations, at the memory 204. In some embodiments, the device 104 queries a storage device, e.g., a database, to retrieve location and/or transmission timing information for a particular cell ID. Thus, based upon the known location of the base stations 106, the relative position of the device 104 with respect to the stations 106, and the transmission timing information, the device 104 determines its geolocation.

It will be appreciated that, generally, the location component 240 identifies a geolocation of the device 104 more accurately when the signals from more base stations are analyzed and compared. For example, a geolocation determination based on signals from five base stations 106 will generally be more accurate than one based on signals from four base stations 106.

It is contemplated that the device 104 is in some embodiments configured to determine the number of base stations 106 signals to be analyzed based on the degree of accuracy sought. For example, if geolocation of relatively high accuracy is needed for a location based service on the phone, then the device 104 could analyze and compare the signals from more base stations 106 to obtain a correspondingly high degree of accuracy in location. If, on the other hand, less accurate position is needed, such as for position when travelling along a highway in the country, the device 104 could in turn analyze and compare signals from fewer base stations 106 to provide geolocation with the corresponding accuracy.

Functions described above with respect the location component 240 are in some embodiments performed in part or altogether by another component of the device 104 and/or a remote device, such as a location server or other remote signal analysis platform (not illustrated) to which the device 104 transmits time delay information.

Figure 5:
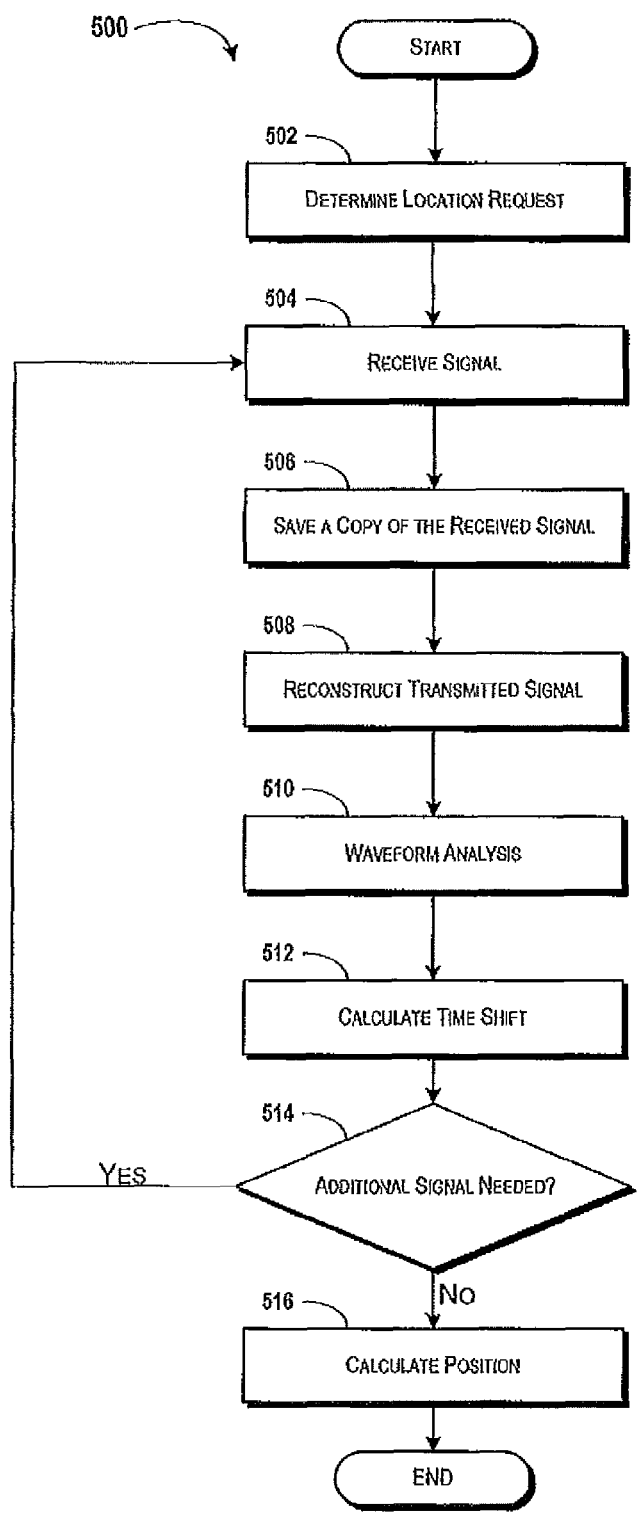
FIG. 5 schematically illustrates a method for determining geolocation using wireless signals, according to an exemplary embodiment of the present disclosure.

FIG. 5 schematically illustrates a method 500 for providing geolocation using wireless signals, according to an exemplary embodiment of the present disclosure. It should be understood that the steps of the method 500 are not necessarily presented in any particular order and that performance of some or all of the steps in an alternative order(s) is contemplated. The steps have been presented in the demonstrated order for ease of description and illustration. In some embodiments, the method 500 includes additional and/or alternative steps. In some embodiments, the illustrated steps are performed simultaneously. In some embodiments of the present disclosure, some or all steps of the method 500, and/or substantially equivalent steps, are performed by execution of computer-readable instructions included on a computer-readable medium, as defined above.

The method 500 begins, and flow proceeds to block 502, wherein the device 104 determines to obtain the location of the device 104 using wireless signals. As discussed above, some embodiments of the location component 240 of the device 104 include a GPS receiver and/or other software and hardware for determining the location of the device 104. As such, in some embodiments the method 500 includes determining whether GPS is available. If GPS is available, the device 104 may use GPS to determine its location. If GPS or another location device is unavailable, then the method 500 proceeds as described below. In some embodiments, the method 500 proceeds in another manner, described below, because GPS is turned off on the device 104, or the device 104 is not equipped with GPS. In other embodiments, the method 500 described below is used to assist another location component of the device 104 in obtaining a GPS lock, or is used to supplement a GPS lock.

At block 504, the device 104 receives a wireless signal via the communications component 222 (shown in FIG. 2). In some embodiments, the wireless signal includes a cellular signal transmitted according to a 4G protocol such as LTE. A length, such as an entirety of the received signal 314' is recorded at the device 104. In some embodiments, the length is determined by time span, for example, 1-999 microseconds, 1-999 milliseconds, or 1 or more seconds of the signal. As illustrated at block 506, a copy of the received signal 314' is saved in data storage device, for example, the memory 204.

At block 508, the device 104 reconstructs the received signal, as explained above with reference to FIG. 3. As also explained above, the device 104 uses, in some embodiments, a VTM 322 or a signal reconstruction application to "reverse engineer" and virtually retransmit the received signal 318 to generate the virtual transmitted signal waveform 314". As explained above, the virtual transmitted signal waveform 314" is a close approximation of the output of the IFFT 306.

At blocks 510 and 512, a copy of the received signal waveform 320 and a copy of the virtual IFFT signal waveform 314" are retrieved from the memory 204 and compared to each other by the TSD 332 to determine a time shift Δt between the received waveform 320 and the virtual transmitted signal 314".

At block 514, the device 104, or a location determination application associated with the device 104, determines if a signal from another base station 106 is needed to determine the location of the device 104. Generally, the accuracy of a location determination using received signals is increased by increasing the number of signals from different base stations 106 used for the location determination, with analysis of signals from just two signals, from two base stations 106 is sufficient to place the device 104 along a hyperbola, and analysis of signals from at least three base stations 106 is needed to determine the position.

In some embodiments, the device 104 determines that additional signals are needed if the device 104 has received less than three signals. In some embodiments, the device 104 determines that additional signals are needed if the device 104 has received less than four signals. Other embodiments are possible and are contemplated.

If the device 104 determines that processing of a signal from an additional base station 106 is needed, such as for increased accuracy, as described above, the method 500 returns to block 504, and the device 104 receives an additional signal. It is contemplated that the device 104 is in some embodiments configured to receive and/or process signals from more than one base station 106 generally simultaneously. If the device 104 determines that an additional signal is not needed, the method 500 proceeds to block 516, whereat the device 104 and/or a remote device (e.g., a remote location server (not shown)) determines its location based upon the received signals, as described above.

In some embodiments, systems and methods according to the present disclosure provide several benefits over some other RF location technologies. Embodiments of systems and methods of the present disclosure do not have to rely upon reference signals or other specific signals. Instead, a wide variety of signals may be used to perform the time-shift analysis disclosed above, thereby allowing distance calculations to be performed.

The Applicants have discovered that some embodiments of the present disclosure improve the signal-to-noise ratio of the signal used for the distance calculations, thereby improving accuracy of the received signal. Furthermore, because no specific signal is required, the device 104 is not required to search for, analyze, and/or store specialized signal waveforms to perform distance calculations. As such, a device 104 can use the disclosed systems and methods whether the device 104 is within a specific geographical sector served by particular base stations 106, as long as the device is able to receive signals from the base stations 106. Additionally, the device 104 can perform distance calculations without having to wait for the broadcast of a reference signal.

Most downstream positioning systems require that transmitters synchronize signals, i.e., signal frames, to accurate clock data such as, for example, GPS time signals. The transmitters need not transmit at the same instant, but the relative time difference between the two transmissions must be known or determined, unless the time difference is zero (e.g., transmitters are synchronized). In systems and methods provided by the present disclosure, each transmitter is considered individually. As such, some embodiments of the present disclosure provide systems and methods for determining geolocation wherein the transmitters, or their transmissions, are not absolutely synchronized to accurate clock data, as long as a relative timing delay among the transmitters is known or can be determined.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

We claim:

1. A system, for determining a location of a receiver, comprising:
    a transmitter configured to transmit a radio signal;
    a receiver communicatively linked to the transmitter, the receiver comprising a clock, a processor and a memory having stored thereon computer-executable instructions that, when executed by the processor, cause the processor to perform a method comprising:
        receiving the radio signal;
        capturing the radio signal as a received signal waveform;
        storing the received signal waveform in the memory;
        calculating a virtual transmitted waveform based upon the received signal waveform; and
        determining, based upon the received signal waveform and the virtual transmitted waveform, a position of the receiver relative to the transmitter.

2. The system of claim 1, wherein the computer-executable instructions that, when executed by the processor, cause the processor to determine the position of the receiver relative to the transmitter, causes the processor to determine the position of the receiver based on the waveforms and transmission timing information regarding the transmitter.

3. The system of claim 2, wherein:
    the transmitter is configured to transmit the signal includes a first transmitter configured to transmit a first radio signal, a second transmitter configured to transmit a second radio signal, and a third transmitter configured to transmit a third radio signal;
    the computer-readable instructions, when executed by the processor, cause the processor to:
        receive the first radio signal, the second radio signal, and the third radio signal;
        perform the receiving, the capturing, the storing, and the calculating with respect to each of the first radio signal, the second radio signal, and the third radio signal; and
        in determining the position of the receiver relative to the transmitter, determine the position of the receiver relative to the first transmitter, the second transmitter, and the third transmitter.

4. The system of claim 2, wherein:
    the receiver comprises a virtual transmitter module configured to calculate the virtual transmitted waveform including generating a virtual transmitted data stream; and
    the virtual transmitted data stream is substantially identical to a transmitted data stream associated with the radio signal transmitted by the transmitter.

5. The system of claim 4, wherein the virtual transmitter module is further configured to virtually transmit the virtual transmitted data stream to obtain a virtual transmitted signal waveform.

6. The system of claim 5, wherein the receiver further comprises a time shift determiner configured to compare the virtual transmitted signal waveform to a received signal waveform to determine a time shift required to align the virtual transmitted signal waveform to the received signal waveform.

7. The system of claim 6, wherein the computer-readable instructions, when executed by the processor, further cause the processor to determine the position of the receiver relative to the transmitter based on the time shift.

8. The system of claim 7, wherein the computer-readable instructions, when executed by the processor, further cause the processor to:
    obtain transmitter location data for the transmitter; and
    determine the location of the receiver based upon the transmitter location data for the transmitter and the position of the receiver relative to the transmitter.

9. The system of claim 4, wherein the virtual transmitter module comprises a data stream determination application, wherein:

the data stream determination application applies a fast Fourier transform algorithm to the received signal waveform to create corresponding data output; and the data stream determination application transmits the data output to an orthogonal frequency-division multiplexing demodulator to generate corresponding virtual transmitted data stream.

10. The system of claim 9, wherein the virtual transmitter module comprises a virtual transmitter application, wherein:
the virtual transmitter application receives the virtual transmitted data stream;
the virtual transmitter application transmits the virtual transmitted data stream to an orthogonal frequency-division multiplexing modulator to generate corresponding modulated data stream; and
the virtual transmitter application applies an inverse fast Fourier transform algorithm to the modulated data stream to generate corresponding virtual transmitted signal waveform.

11. The system of claim 10, wherein the computer-readable instructions, when executed by the processor, further cause the processor to store the virtual transmitted signal waveform at the memory.

12. A method, for determining location of a receiver using a radio signal, comprising:
transmitting from the transmitter, a signal;
receiving the radio signal at a receiver in communication with the transmitter;
capturing the radio signal, at the receiver, as a received signal waveform;
storing, at a memory device associated with the receiver, the received signal waveform;
calculating, at the receiver, a virtual transmitted signal waveform wherein the virtual transmitted signal waveform is calculated based upon the received signal waveform; and
determining, at the receiver, a position of the receiver relative to the transmitter based upon the received signal waveform and the virtual transmitted signal waveform.

13. The method of claim 12, wherein determining the position of the receiver relative to the transmitter is based on the waveforms and transmission timing information regarding the transmitter.

14. The method of claim 13, wherein calculating the virtual transmitted signal waveform includes:
generating a data stream at a virtual transmitter module of the receiver, the data stream being substantially identical to a transmitted data stream including the radio signal transmitted by the transmitter; and
virtually transmitting the data stream to obtain the virtual transmitted signal waveform.

15. The method of claim 14, further comprising:
determining a time difference with respect to the signal corresponding to the transmitter including:
comparing, at a time shift determiner associated with the receiver, the virtual transmitted signal waveform to the received signal waveform;
determining, at the time shift determiner, the time difference being the time shift required to align the virtual transmitted signal waveform to the received signal waveform;
obtaining transmitter location data for the transmitter; and
determining the location of the receiver based upon the transmitter location data for the transmitter and the position of the receiver relative to the transmitter.

16. The method of claim 15, further comprising, for the received radio signal:
applying a fast Fourier transform algorithm to the received signal waveform to create a data output;
transmitting the data output to an orthogonal frequency-division multiplexing demodulator to generate a virtual transmitted data stream;
transmitting the virtual transmitted data stream to an orthogonal frequency-division multiplexing modulator to generate a modulated data stream;
applying an inverse fast Fourier transform algorithm to the modulated data stream to generate the virtual transmitted signal waveform; and
storing the virtual transmitted signal waveform at the memory.

17. A non-transitory computer readable medium having stored thereon computer readable instructions that, when executed by a processor, cause the processor to perform a method comprising:
receiving a radio signal, the radio signal being transmitted by a transmitter in communication with a receiver;
capturing the radio signal received as a received signal waveform;
storing the received signal waveform at a memory device associated with the receiver;
obtaining virtual transmitted waveform based upon the radio signal received from the transmitter; and
determining a position of the receiver relative to the transmitter based upon the received signal waveform and the virtual transmitted waveform.

18. The computer readable medium of claim 17, wherein the computer readable instructions, when executed by the processor, further cause the processor to perform operations comprising:
generating a data stream at a virtual transmitter module associated with the receiver, the data stream being substantially identical to the data stream transmitted by the transmitter;
virtually transmitting the data stream at the virtual transmitter module associated with the receiver to obtain the respective virtual transmitted signal waveform;
obtaining transmitter location data for the transmitter; and
determining the location of the receiver based upon the transmitter location data for the transmitter and the position of the receiver relative to the transmitter.

19. The computer readable medium of claim 18, wherein the computer readable instructions, when executed by the processor, further cause the processor to perform operations comprising:
applying, at the virtual transmitter module, a fast Fourier transform algorithm to each received signal waveform to create respective data output;
transmitting the data output to an orthogonal frequency-division multiplexing demodulator to generate respective virtual transmitted data stream;
transmitting each virtual transmitted data stream to an orthogonal frequency-division multiplexing modulator to generate respective modulated data stream;
applying an inverse fast Fourier transform algorithm to each modulated data stream to generate the respective virtual transmitted signal waveform;
storing the virtual transmitted signal waveform at the memory;
retrieving, at a time shift determiner associated with the receiver, the transmitted signal waveform;

comparing, at the time shift determiner, the virtual transmitted signal waveforms to the received signal waveform;

determining, at the time shift determiner, a time shift required to align the virtual transmitted signal waveform to the received signal waveform.

20. The computer readable medium of claim 19, wherein the computer readable instructions, when executed by the processor, further cause the processor to perform operation comprising:

outputting the time shift;

determining, at the receiver, the position of the receiver relative to the transmitter based on the time shift;

obtaining, at the receiver, transmitter location data associated with the transmitter; and determining, at the receiver, the location of the receiver based upon the transmitter location data for the transmitter and the position of the receiver relative to the transmitter.

* * * * *